Aug. 3, 1937. J. A. BRAMALL 2,088,573
PRACTICE BIRD FOR BADMINTON
Filed July 16, 1936
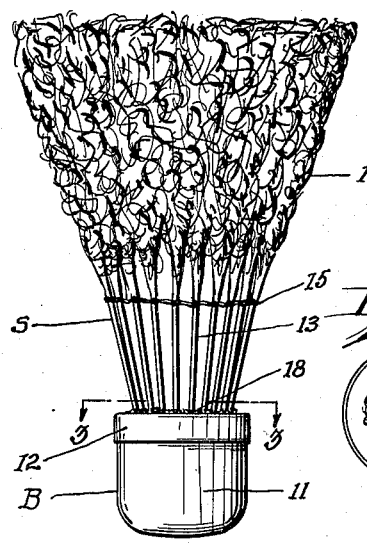
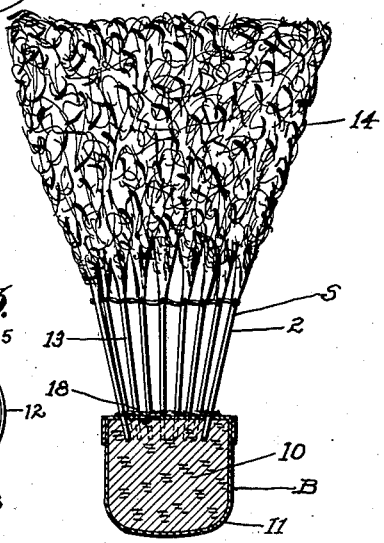
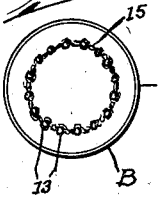
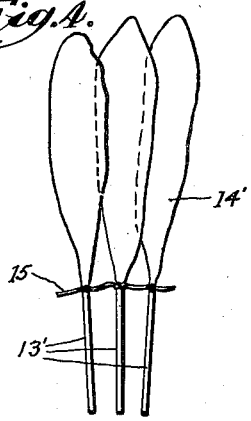
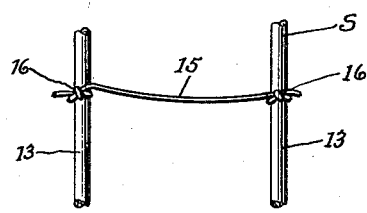
Inventor
John A. Bramall
by Watson E. Coleman
Attorney.

Patented Aug. 3, 1937

2,088,573

UNITED STATES PATENT OFFICE 2,088,573

PRACTICE BIRD FOR BADMINTON

John A. Bramall, Upper Darby, Pa.

Application July 16, 1936, Serial No. 90,984

4 Claims. (Cl. 273—106)

To those familiar with the popular game of badminton, the regular or standard shuttlecock, or "bird" as it is called, and which comprises a tip or base of rubber or cork preferably covered with kid and shafts of real feathers having their quills partially embedded in the tip or base, wears out and becomes useless very quickly, sometimes lasting only two or three hard-fought games or sets in match or tournament play.

With this in mind, the primary object of my invention is a practice bird designed not to take the place of the authorized feather bird in tournament or match play but as a fitting substitute for the feather bird for practice work, in developing the beginner and the ordinary player of the game, his footwork, and general stroking, as well as to facilitate his learning to follow the flight of a bird up to and including the actual stroking of the bird on his racket.

A further object of the invention is a practice bird which will be exceedingly durable and far outlasting the authorized feather bird and which at the same time will correspond to the regular or authorized feather bird in weight and general playing serviceability.

A still further object of the invention is a device of this character which can be very economically made, much cheaper than the regular or authorized feather bird, and which can be easily varied in construction so as to make it faster or slower as the requirements of the particular player's case for practice may demand.

With these and other objects in view, as will more fully appear as the description proceeds, reference is to be had to the accompanying drawing wherein are illustrated several different modifications or embodiments of my inventive idea and in which Figure 1 is a side elevation of one form or embodiment of a badminton practice bird constructed in accordance with my invention.

Fig. 2 is a similar view with the tip or base in section.

Fig. 3 is a detail sectional view on the line 3—3 of Fig. 1.

Fig. 4 is a detail view of three shafts showing another embodiment of the invention.

Figs. 5, 6, and 7 are detail views of other shafts, and

Fig. 8 is an enlarged fragmentary view showing the manner in which the shafts are tied together and retained in proper position relative to each other.

The base B of my badminton practice bird may be made of rubber or cork, but preferably the latter, as indicated at 10 in Fig. 2, and has a covering of moleskin 11 which is caused to adhere to the cork and which is reinforced and retained in position by a binding collar 12 formed of silk ribbon.

The shafts S illustrated in Figs. 1 and 2 of the drawing are formed of twisted silk or twisted sheep gut treated with some adhesive substance similar to that used in the making of the strings for tennis, badminton, or squash rackets and each shaft is twisted or otherwise embedded at its end in the body portion of the base B and comprises a spindle portion 13 and fluff portion 14. This fluff portion 14 may manifestly be made denser or lighter as the manufacturer may desire, not only for durability but to vary the speed of the bird in actual play, and one of these shafts is shown in detail in Fig. 7 and another designated 13ª with a fluff 14ª is illustrated in Fig. 6, wherein it will be noted that the fluff 14ª is not quite so fine as the fluff illustrated in Figs. 1 and 2, for example.

As best illustrated in Figs. 1 and 2 and more in detail in Fig. 8, the shafts S are tied together by means of a retaining member 15 which is preferably composed of linen thread, a double knot 16 being made in each shaft with the thread whereby all of the shafts will be maintained in proper relation to each other during the use of the bird, the retaining member 15 being preferably positioned near the juncture between the spindle portions 13 and the fluff portions 14 of the shafts.

In Fig. 4 another embodiment of my inventive idea is illustrated. In this figure there are three shafts 13' illustrated, and the fluff portion of the bird is composed of vane-like portions 14' preferably overlapping to some extent along their longitudinal edges and being relatively flat by untwisting the twisted silk or gut to simulate the vane portions of real feathers, as in the authorized feather bird.

Fig. 5 illustrates a somewhat similar embodiment in which 13" designates the spindle portion of a shaft and 14" the fluff portion, the latter being relatively flat to form a vane, as in Fig. 4, but in Fig. 5 it will be noted that the vane is longitudinally split or cut as at 17 and not a solid vane as illustrated in Fig. 4. Preferably the upper surface of the top or base B is coated with shellac, glue, or some similar substance, as indicated at 18, to assist in holding the tips of the spindle portions 13 of the shafts S in place in the cork body 10 of the base, although these tip ends are securely held by the compression of the cork itself and the coating 18 is merely provided as an additional feature of durability.

From the foregoing description in connection with the accompanying drawing, it will be seen that I have provided a very simple, durable, and efficient construction of practice bird for the game of badminton, which will fulfill the requirements and attain the results specified as the objects of the invention at the outset of the specification. A bird so constructed will unquestionably be found better for beginners and those who wish to improve their speed and foot work than the regulation feather bird, and as the player in practice becomes more skilful in "stroking" the bird with his racket, he can if he wishes, speed up the bird either by employing one in which the fluff has disintegrated in use to such an extent as to make it speedy, or can initially cut down the fluff when he receives the bird in its original condition from the manufacturer or dealer and thus make it speedy from the outset without waiting for a natural disintegration of the fluff as would occur after a relatively long use of the bird. Manifestly a practice bird constructed in accordance with my invention will be considerably more durable than the authorized feather bird, as the twisted silk or twisted sheep gut forming the shafts with their spindle portions 13 and fluffs 14 and 14' etc., have considerable tensile strength as well as durability, and I have found by actual test that a bird constructed in accordance with my invention will average ten to fifteen hard-played games, whereas the life of an authorized feather bird is limited to one or two hard-fought games in match or tournament play.

Preferably the base B is white and the shafts, particularly the fluff portions thereof, are colored. This is especially important when the device is used at night under artificial light and the player can select a color to play with which will be in contrast to the painting on the walls which makes it easier to follow the bird with the eye.

Preferably also the base B is somewhat flattened on the bottom, as clearly illustrated in the drawing, thereby presenting a larger hitting surface for the racket and an easier control of the direction of the bird when struck.

In the regular birds there is usually embodied in the cork base a piece of metal to make the base sufficiently heavy so that it will come down first, but in my device this piece of metal is not necessary as the moleskin is heavy enough to impart the necessary weight to the base.

What is claimed, is:

1. A device of the character described comprising a base, and shafts connected at one end to the base, said shafts being formed of twisted sheep gut throughout a portion of their length to provide spindles and being untwisted for the remaining portion of their length to form fluffs.

2. A device of the character described comprising a base, and shafts connected to said base, said shafts being formed of sheep-gut twisted for a portion of their length with the ends of the twisted portions embedded in the base and with the remaining portions relatively flat to form vanes which overlap along their longitudinal edges.

3. A device of the character described comprising a base, and shafts connected to said base, said shafts being formed of sheep-gut twisted for a portion of their length with the ends of the twisted portions embedded in the base and with the remaining portions relatively flat to form vanes which overlap along their longitudinal edges, said vanes being longitudinally split.

4. A device of the character described, comprising a base, and shafts connected at one end to said base, said shafts being formed of material twisted throughout a portion of its length to form a spindle and being untwisted for the remaining portion of its length to form a fluff.

JOHN A. BRAMALL.